(12) United States Patent
Simileysky et al.

(10) Patent No.: US 10,861,462 B2
(45) Date of Patent: Dec. 8, 2020

(54) DUAL PIPELINE ARCHITECTURE FOR WAKEUP PHRASE DETECTION WITH SPEECH ONSET DETECTION

(71) Applicant: Cypress Semiconductor Corporation, San Jose, CA (US)

(72) Inventors: Victor Simileysky, San Jose, CA (US); Robert Zopf, Rancho Santa Margarita, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/000,102

(22) Filed: Jun. 5, 2018

(65) Prior Publication Data
US 2019/0279641 A1    Sep. 12, 2019

Related U.S. Application Data

(60) Provisional application No. 62/641,753, filed on Mar. 12, 2018.

(51) Int. Cl.
| | |
|---|---|
| *G10L 15/28* | (2013.01) |
| *G10L 25/87* | (2013.01) |
| *G10L 15/18* | (2013.01) |
| *G06F 3/16* | (2006.01) |

(52) U.S. Cl.
CPC ............. *G10L 15/28* (2013.01); *G06F 3/165* (2013.01); *G10L 15/1815* (2013.01); *G10L 25/87* (2013.01)

(58) Field of Classification Search
None
See application file for complete search history.

(56) References Cited

U.S. PATENT DOCUMENTS

| | | |
|---|---|---|
| 7,979,277 B2 | 7/2011 | Larri et al. |
| 8,972,252 B2 | 3/2015 | Hung et al. |
| 9,142,215 B2 | 9/2015 | Rosner et al. |
| 9,437,211 B1 * | 9/2016 | Su .................. G10L 21/0208 |

(Continued)

FOREIGN PATENT DOCUMENTS

GB    2512178 A    9/2014

OTHER PUBLICATIONS

He, Qing, "An Architecture for Low-Power Voice-Command Recognition Systems," Massachusetts Institute of Technology, Jun. 2016, pp. 1-157; 157 pages.

(Continued)

*Primary Examiner* — Douglas Godbold (57) ABSTRACT

A phrase detection device includes a high latency pipeline to transmit a first portion of audio data from an audio data source to a processing unit, where the high latency pipeline includes a history buffer to store the first portion of the audio data, and a low latency pipeline to transmit a second portion of the audio data from the audio data source to the processing unit with a lower latency than the high latency pipeline. A sound onset detector coupled with the audio data source detects a sound onset event based on the audio data. A synchronization circuit coupled with the high latency pipeline and the low latency pipeline, in response to the sound onset event, synchronizes output to the processing unit of the first portion of the audio data stored in the history buffer and the second portion of the audio data via the low latency pipeline.

19 Claims, 4 Drawing Sheets

(56) References Cited

U.S. PATENT DOCUMENTS

| | | | |
|---|---|---|---|
| 9,445,209 B2 | 9/2016 | Dadu et al. | |
| 9,478,231 B1* | 10/2016 | Soman | G06F 1/3206 |
| 9,502,028 B2 | 11/2016 | Nandy et al. | |
| 9,779,726 B2 | 10/2017 | Hatfield et al. | |
| 2011/0130176 A1* | 6/2011 | Magrath | G10K 11/178 |
| | | | 455/570 |
| 2013/0197920 A1* | 8/2013 | Lesso | H04L 25/4902 |
| | | | 704/500 |
| 2013/0275164 A1* | 10/2013 | Gruber | G10L 17/22 |
| | | | 705/5 |
| 2014/0278443 A1* | 9/2014 | Gunn | G10L 17/24 |
| | | | 704/275 |
| 2014/0358552 A1* | 12/2014 | Xu | G10L 25/78 |
| | | | 704/275 |
| 2015/0112690 A1 | 4/2015 | Guha et al. | |
| 2016/0125879 A1 | 5/2016 | Lovitt | |
| 2016/0189706 A1 | 6/2016 | Zopf et al. | |
| 2016/0196838 A1* | 7/2016 | Rossum | H04R 29/004 |
| | | | 381/97 |
| 2016/0379635 A1 | 12/2016 | Page | |
| 2017/0133041 A1 | 5/2017 | Mortensen et al. | |
| 2017/0263268 A1* | 9/2017 | Rumberg | G10L 25/81 |
| 2018/0158460 A1* | 6/2018 | Lee | G10L 15/22 |
| 2018/0174581 A1* | 6/2018 | Wang | G10L 15/22 |

OTHER PUBLICATIONS

International Search Report for International Application No. PCT/US19/19133 dated Jul. 26, 2019; 2 pages.

Written Opinion for the International Searching Authority for International Application No. PCT/US19/19133 dated Jul. 26, 2019; 7 pages.

* cited by examiner

DUAL PIPELINE ARCHITECTURE FOR WAKEUP PHRASE DETECTION WITH SPEECH ONSET DETECTION

RELATED APPLICATIONS

This application claims priority to U.S. Provisional Application No. 62/641,753, filed on Mar. 12, 2018, which is incorporated by reference herein in its entirety.

TECHNICAL FIELD

This disclosure relates to the field of speech recognition and, in particular, to speech onset and wakeup phrase detection.

BACKGROUND

An increasing number of modern computing devices feature speech recognition capabilities, allowing users to perform a wide variety of computing tasks via voice commands and natural speech. Devices such as mobile phones or smart speakers provide integrated virtual assistants that can respond to a user's commands or natural language requests by communicating over local and/or wide area networks to retrieve requested information or to control other devices, such as lights, heating and air conditioning controls, audio or video equipment, etc. Devices with speech recognition capabilities often remain in a low power consumption mode until a specific word or phrase is spoken (i.e., a wake-up phrase), allowing a user to control the device using voice commands after the device is thus activated.

However, the implementation of wake-up phrase detection results in increased power consumption due to a portion of the device, including the microphone and some speech detection circuitry, remaining in a powered state over long periods of time. Furthermore, additional circuitry used for performing wake-up phrase detection can add latency that manifests as a slower response time when general speech recognition is in progress.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the claimed subject matter. It will be apparent to one skilled in the art, however, that at least some embodiments may be practiced without these specific details. In other instances, well-known components or methods are not described in detail or are presented in a simple block diagram format in order to avoid unnecessarily obscuring the claimed subject matter. Thus, the specific details set forth are merely exemplary. Particular implementations may vary from these exemplary details and still be contemplated to be within the scope of the claimed subject matter.

For a speech recognition enabled device, implementation of WakeUp Phrase Detection (WUPD) technology allows power gating of the main processing elements of the device, which are maintained in a low power consumption state (e.g., sleep state) until the wakeup phrase is detected. In one embodiment, WUPD itself utilizes significant power and processing resources and is therefore also gated by Speech Onset Detection (SOD) or Noise Threshold Level Analyzer (NTLA) technologies, which consume less power than WUPD. When the SOD or NTLA circuitry detects a speech onset event, the WUPD circuitry is activated (i.e., transitioned to a higher power consumption state) to determine whether the wakeup phrase has been spoken.

According to one approach, audio data from the microphone is processed serially by the SOD circuitry for detecting a speech onset event, and then by the WUPD circuitry to detect the wakeup phrase; however, using high quality audio data for performing SOD unnecessarily increases complexity and power consumption, since SOD can be performed effectively using lower quality audio data than WUPD. Serial processing of audio data also increases latency because WUPD is effective when a period of silence (or relative quiet) prior to speech onset is included in the audio data. In one embodiment, the period of silence or relative quiet is characterized by a sound level that is below a predetermined detection threshold or is less than a threshold amount above the ambient noise level. A history buffer captures this period of silence prior to speech onset; however, a history buffer in the pipeline increases the latency between the microphone and the WUPD input.

One embodiment of a computing device implements a phrase detection circuit that includes two processing pipelines, with a first high latency and low audio quality pipeline for performing SOD (or NTLA) and a second low latency and high audio quality pipeline for performing WUPD processing. In such an embodiment, the SOD responds to detecting a speech or other sound onset event by waking the WUPD circuitry. Power is conserved during the time spent waiting for a speech onset event since the SOD operates on lower quality audio data, allowing the SOD circuitry to operate at a lower clock rate. A history buffer in the high latency pipeline records audio samples prior to the speech onset event. The history buffer is accessible by the WUPD circuitry via a dedicated interface and does not increase the latency of high quality audio data provided to the WUPD circuitry via the second low latency pipeline.

In response to detecting the speech onset event, the SOD circuitry wakes the WUPD circuitry, which is supplied power in a different power domain than the SOD circuitry. The SOD circuitry operates in a low power consumption power domain that remains powered over longer periods of time, while the WUPD operates in a power domain that consumes a greater amount of power during limited times after a speech onset event is detected.

The WUPD circuitry includes a processing unit that, when the WUPD circuitry is activated, performs higher complexity and higher powered computations (relative to SOD) to determine whether a particular wakeup word or phrase has been spoken. The WUPD makes this determination based on the audio data recorded in the history buffer (corresponding to the time prior to speech onset) and the high quality audio data received via the low latency pipeline. Thus, the WUPD and subsequent speech recognition tasks are performed using the high quality and low latency pipeline, resulting in increased responsiveness to user commands.

Figure 1:
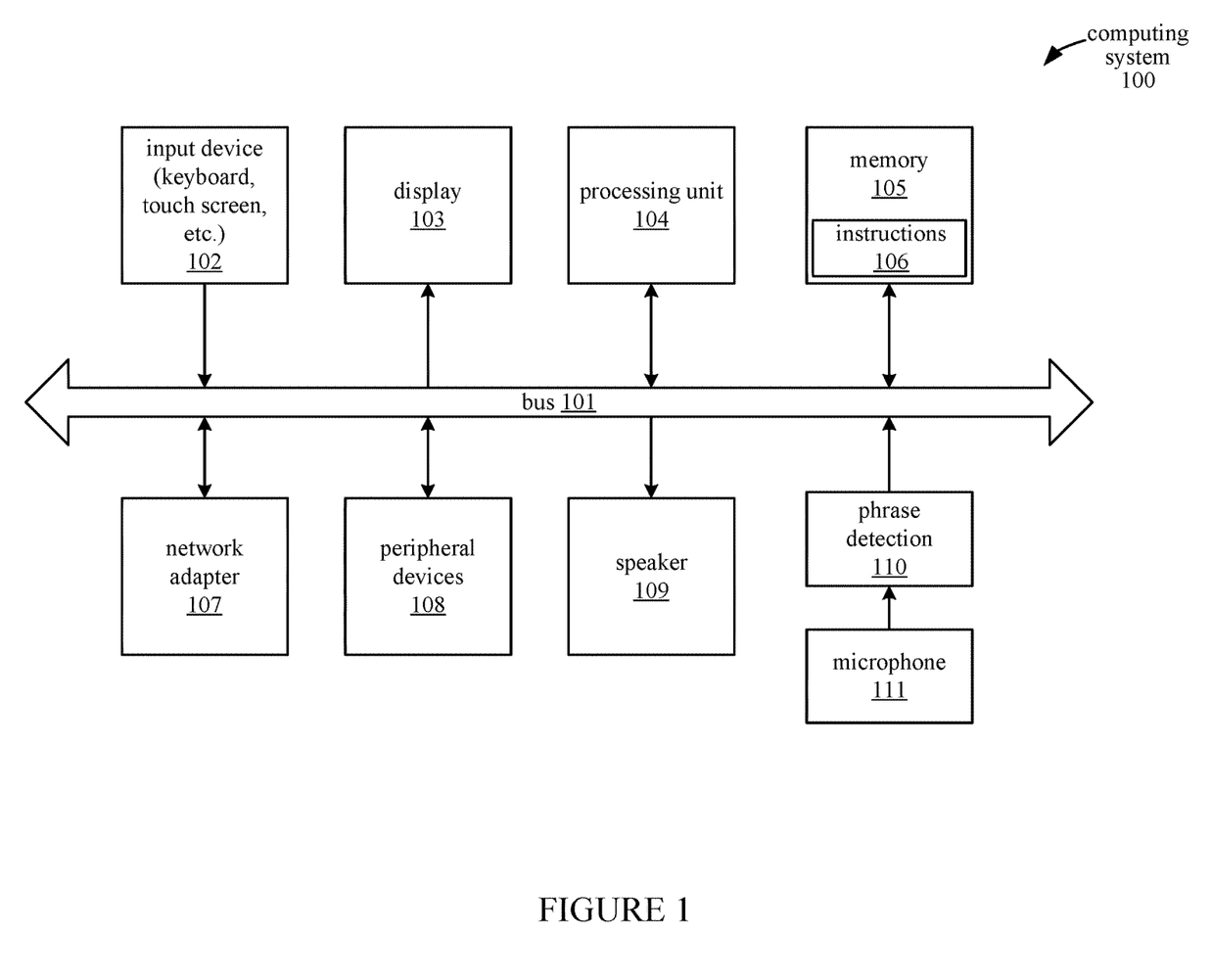
FIG. 1 is a block diagram of a computing system, according to an embodiment.

FIG. 1 illustrates an embodiment of a computing system 100 in which SOD and WUPD circuitry is implemented. In general, the computing system 100 is embodied as any of a number of different types of devices, including but not limited to a laptop or desktop computer, mobile device, smart speaker, vehicle infotainment system, home appliance, etc. The computing system 100 includes a number of components 102-111 that communicate with each other through a bus 101. In computing system 100, each of the components 102-111 is capable of communicating with any of the other components 102-111 either directly through the bus 101, or via one or more of the other components 102-111. The components 101-108 in computing system 100 are contained within a single physical enclosure, such as a laptop or desktop chassis, mobile phone casing, smart speaker housing, etc. In alternative embodiments, some of the components of computing system 100 are embodied as peripheral devices such that the entire computing system 100 does not reside within a single physical enclosure.

The computing system 100 also includes user interface devices for receiving information from or providing information to a user. Specifically, the computing system 100 includes an input device 102, such as a keyboard, mouse, touch-screen, or other device for receiving information from the user. The computing system 100 displays information to the user via a display 103, such as a monitor, light-emitting diode (LED) display, liquid crystal display, or other output device.

Computing system 100 additionally includes a network adapter 107 for transmitting and receiving data over a wired or wireless network. Computing system 100 also includes one or more peripheral devices 108. The peripheral devices 108 may include mass storage devices, location detection devices, sensors, input devices, or other types of devices used by the computing system 100.

Computing system 100 includes a processing unit 104. The processing unit 104 receives and executes instructions 106 that are stored in a memory system 105. In one embodiment, the processing unit 104 includes multiple processing cores that reside on a common integrated circuit substrate. Memory system 105 includes memory devices used by the computing system 100, such as random-access memory (RAM) modules, read-only memory (ROM) modules, hard disks, and other non-transitory computer-readable media.

Some embodiments of computing system 100 may include fewer or more components than the embodiment as illustrated in FIG. 1. For example, certain embodiments are implemented without any display 103 or input devices 102. Other embodiments have more than one of a particular component; for example, an embodiment of computing system 100 could have multiple processing units 104, buses 101, network adapters 107, memory systems 105, etc.

In general, computing system 100 represents a device having speech recognition capabilities; thus, the system 100 includes a microphone 111 for receiving voice commands and other speech, and a speaker 109 for providing synthesized vocal feedback to the user and/or playing other sounds such as music, alerts, etc. The processing unit 104 executes instructions 106 from the memory system 105 to implement a speech recognition engine, which is capable of recognizing one or more voice commands. The computing system 100 responds to a recognized voice command by performing a task associated with the voice command, which may include controlling local or remote hardware resources, retrieving information, etc. For example, one or more of the recognized voice commands can cause the computing system 100 to transmit one or more network messages over a network via the network adapter 107 to retrieve information from the Internet, place a phone call, remotely control home appliances or entertainment systems, etc. In one embodiment, the speaker device 109 generates a sound output in response to the recognized voice commands in order to confirm to the user that the voice command was correctly recognized or executed, or to relay retrieved or calculated information back to the user.

In one embodiment, different parts of the computing system 100 are power gated to conserve power when they are not being used. For example, the processing unit 104 implementing the speech recognition engine is kept in a sleep state until the phrase detection circuitry 110 detects that a wakeup phrase has been spoken by the user. The phrase detection circuit 110 receives an audio signal from an audio transducer (i.e., microphone 111) and detects a speech onset event (i.e., when a user begins speaking after a period of silence) and then detects whether the detected speech includes the wakeup phrase.

Figure 2:
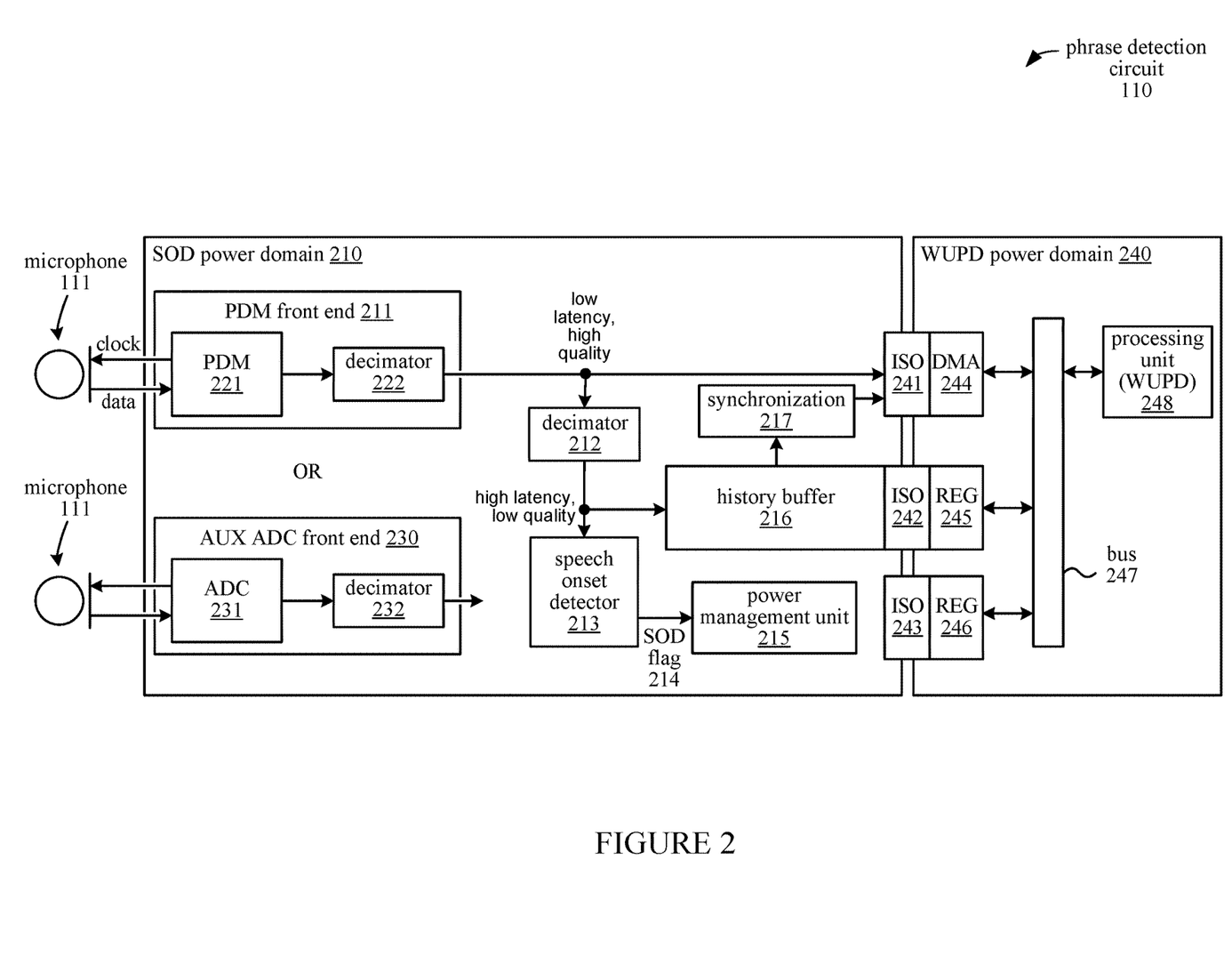
FIG. 2 illustrates a block diagram of a phrase detection circuit, according to an embodiment.

FIG. 2 illustrates an embodiment of the phrase detection circuit 110, including speech onset detection (SOD) circuitry and wakeup phrase detection (WUPD) circuitry. In one embodiment, some or all of the phrase detection circuit 110 is implemented by circuitry in an integrated circuit device (i.e., on a single integrated circuit substrate) or in a single device package. In alternative embodiments, the components of phrase detection circuit 110 are distributed among multiple integrated circuit devices, device packages, or other circuitry. The phrase detection circuit 110 includes a first low latency and high quality pipeline for transmitting audio data from an audio data source to the WUPD circuitry, and a high latency and low quality pipeline for transmitting audio data from the audio data source to the WUPD circuitry.

In one embodiment, the audio data source is a pulse density modulator (PDM) front end 211 that is connected to the microphone 111. In the PDM front end 211, the PDM 221 generates a pulse density modulated bitstream based on a signal from a transducer (i.e., microphone 111). The PDM 221 provides a clock signal to the microphone 111 that determines the initial sampling rate, then receives a data signal from the microphone 111 representing audio captured from the environment. From the data signal, the PDM 221 generates a PDM bitstream and provides the bitstream to a decimator 222, which generates the audio data provided to the high latency and low latency pipelines by reducing a sample rate of the pulse density modulated bitstream from PDM 221.

In an alternative embodiment, the audio data source is an auxiliary analog to digital converter (AUX ADC) front end 230. In the auxiliary ADC front end 230, an analog to digital converter 231 converts an analog signal from the microphone 111 to a digital audio signal. The digital audio signal is provided to a decimator 232, which reduces the sample rate of the digital audio signal from ADC 231 to generate the audio data provided to the high latency and low latency pipelines.

The high latency, low quality pipeline includes another decimator 212 and a history buffer 216. The speech onset detector (SOD) 213 is connected to an output of the decimator 212. The decimator 212 further reduces the sample rate of the audio data and provides this lower quality audio data to the history buffer 216 and the SOD 213. In one embodiment, the history buffer 216 is a circular buffer that stores a portion of the audio data, including a fixed number of the most recently received data samples of the audio data. Each audio data sample that is received at the input of the history buffer 216 is written at a current position in the buffer 216, after which the current position is incremented to the next sequential position in the buffer 216. Upon reaching a final position in the sequence (e.g., corresponding to an end of the buffer 216), the buffer 216 restarts the sequence, overwriting the oldest data samples that were previously stored in the buffer. The history buffer 216 stores the audio data from the output of decimator 212 with the reduced sample rate; thus, the history buffer 216 consumes less memory than if the sample rate was not reduced.

At the same time that the history buffer 216 is recording samples of the low quality version of the audio data at the lower sample rate, the SOD 213 also analyzes the low quality audio data to detect any speech onset events captured in the audio data. The audio data with the reduced sample rate is sufficient for detecting a speech onset (or other sound onset) event while allowing the SOD 213 circuitry to be clocked at a lower frequency, thus reducing the power consumption and complexity of the SOD.

The speech onset detector 213 (or other type of sound onset detector) and the history buffer 216 are supplied power in a first power domain 210, while the WUPD circuitry is supplied power in a second power domain 240 that is isolated from the first power domain 210 by isolation cells 241-243. The SOD power domain 210 remains powered over a longer duration of time during which the SOD 213 and the history buffer 216 may operate continuously, allowing the device to detect speech onset events during this time that are caused by a user speaking the wakeup phrase.

Upon detecting a speech onset event, the SOD 213 asserts a SOD flag 214. A power management unit 215 receives the SOD flag 214 and responds by enabling the WUPD power domain 240 to wake the WUPD circuitry from a low power consumption state (e.g., sleep state) to a higher power consumption state. The WUPD processing unit 248 performs wakeup phrase detection using a first portion of the audio data samples received from the PDM front end 211 via the high latency pipeline (through the history buffer 216) and a second portion of audio data samples received from the PDM front end 211 via the low latency pipeline.

The synchronization circuit 217 responds to the speech onset event by synchronizing the flow of data output from the two pipelines to the WUPD processing unit 248 to prevent the processing unit 248 from receiving redundant audio data samples or failing to receive all of the available audio data samples for a contiguous time period over which the WUPD is performed. In particular, the synchronization circuit 217 synchronizes the output of the audio data from the two pipelines by recording a memory location in the history buffer 216 that corresponds the time of an initial data sample of the second portion of the audio data transmitted to the processing unit.

When a speech onset event is detected, the WUPD processing unit 248 retrieves audio data from the history buffer 216. Some of this data may represent silence or relative quiet that is recorded prior to speech onset, which facilitates detection of the wakeup phrase. In one embodiment, the recorded silence is not absolute silence, but includes ambient noise that can be used for noise statistics estimation and phrase clipping avoidance. The WUPD processing unit 248 retrieves this first portion of the audio data via a dedicated set of registers 245. The samples of the first portion of the audio data are thus transmitted asynchronously via register access to the processing unit 248. From the registers 245, the samples of the first portion of the audio data are transmitted over the bus 247 to the processing unit 248. In one embodiment, the bus 247 is an Advanced High-Performance Bus (AHB).

The low latency, high quality pipeline provides a stream of audio data samples from the PDM front end 211 to the processing unit 248 via a direct memory access (DMA) interface 244. In one embodiment, the audio data samples transmitted via the low latency pipeline represent a second portion of the audio data that has little or no overlap with the first portion. In other words, the first portion and the second portion include samples captured over different periods of time. Data is transmitted over the low latency pipeline from the PDM front end 211 to the processing unit 248 with a lower latency than the data transmitted over the high latency pipeline, since data transmitted over the low latency pipeline is not delayed by the history buffer 216. In addition, the audio data transmitted over the low latency pipeline is a higher quality (i.e., has a higher sample rate) than the lower quality audio data transmitted over the high latency pipeline. The higher quality audio data is used for the WUPD process and subsequently for general voice command and speech recognition by the speech recognition engine. In an alternative embodiment, the history buffer 216 records the high quality audio data instead of the low quality audio data. In such an embodiment, the history buffer 216 receives the high quality audio data from the PDM front end 211 instead of from decimator 212.

Figure 3:
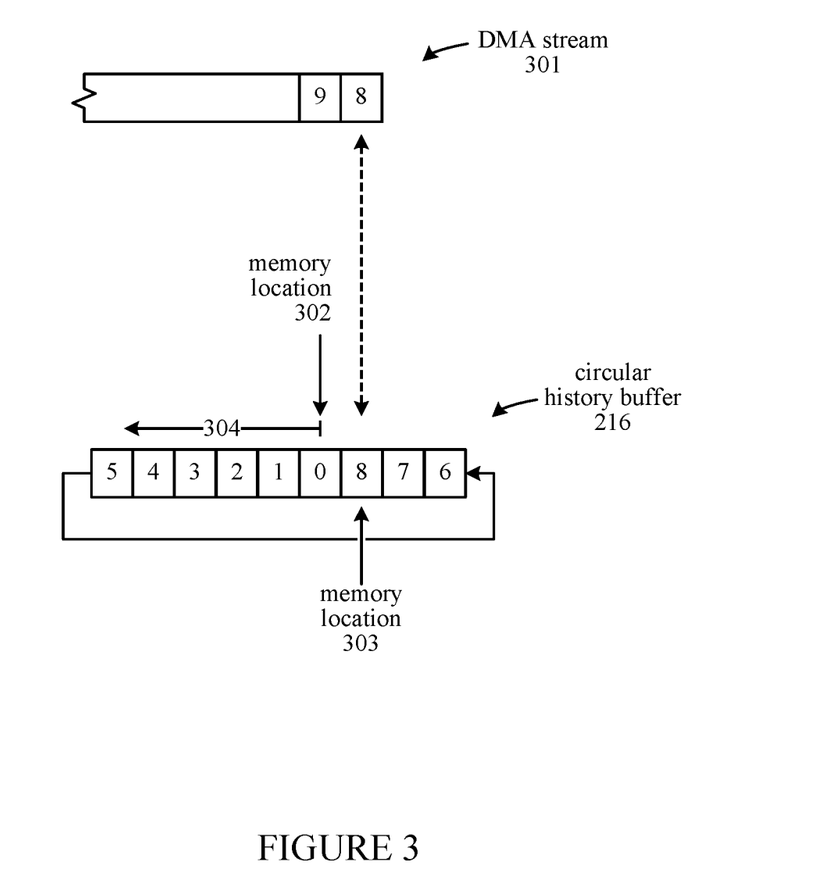
FIG. 3 illustrates an approach for synchronizing a data stream with a history buffer, according to an embodiment.

FIG. 3 illustrates an approach for synchronizing the audio data in the DMA stream provided via the low latency pipeline with the audio data provided from the history buffer 216, according to an embodiment. In FIG. 3, the audio data samples are indicated by the single digit numbers in the DMA stream 301 and the history buffer 216, where lower numbers indicate earlier samples.

When the processing unit 248 is activated, the processing unit 248 begins reading the most recently captured audio samples from the DMA stream 301, which are transmitted to the processing unit 248 via the low latency pipeline. At this time, the synchronization circuit 217 records a memory location 303 in the history buffer 216 that corresponds to the sampling time at which the initial data sample (i.e., sample '8') in the DMA stream 301 was captured. As illustrated in FIG. 3, the recorded memory location 303 stores a corresponding data sample '8' captured at the same time as the initial data sample '8' in the DMA stream 301.

In one embodiment, the recorded memory location is determined based on the sample time of the initial sample in the DMA stream 301 or the start of the DMA stream 301; however, the recorded memory location need not contain a sample that is captured at exactly the same time as the initial sample in the DMA stream. The sampling times of the initial sample in the DMA stream 301 and the sample at the recorded memory location in the buffer 216 can differ by a finite amount of time or number of samples. In one embodiment, some amount of gap or overlap between the samples in the buffer 216 and the stream 301 is tolerated by the WUPD process. In addition, corresponding sample '8' from the stream 301 and sample '8' in the buffer 216 need not have the same sampling period, since the sampling rate of the audio data in the DMA stream 301 is higher than the sampling rate of the audio data stored in the history buffer 216.

After waking, the processing unit 248 retrieves samples of the first portion of the audio data from the history buffer 216 by reading the samples from sequential memory locations in the buffer 216 via registers 245. The processing unit 248 reads the memory locations in direction 304, starting from the oldest sample in the buffer 216 at memory location 302 (i.e., sample '0'). Upon reaching the end of the buffer 216 (i.e., sample '5'), the readout continues at the other end of the buffer (i.e., sample '6') and proceeds until reaching the memory location 303 that was recorded by the synchronization circuit 217.

In one embodiment, the readout of the first portion of the audio data from the history buffer 216 is performed asynchronously at a faster rate than real time, allowing the readout of the buffer 216 to catch up to the DMA stream 301. In one embodiment, the audio data from the DMA stream 301 is buffered by the processing unit 248 while the samples in the history buffer 216 are being read. Upon reaching the recorded memory location 303, the processing unit 248 retrieves and begins processing the initial data sample (i.e., sample '8') of the second portion of the audio data. The continuous stream of low latency and high quality audio data from the DMA stream 301 is used thereafter for performing the WUPD, and for subsequent voice command, speech recognition, and other audio recording and processing tasks.

The processing unit 248 initiates the speech recognition engine in response to recognizing the wakeup phrase (or other sound pattern) based on the first and second portions of the audio data. Components of the computing system 100, such as the processing unit 104 and the memory 105, that are used for implementing the speech recognition engine are transitioned from a low power consumption state (e.g., a sleep state) to a higher power consumption state (e.g., a working state). When thus activated, the speech recognition engine recognizes voice commands and/or other spoken language using the continuing stream of audio data from the DMA stream 301.

Figure 4:
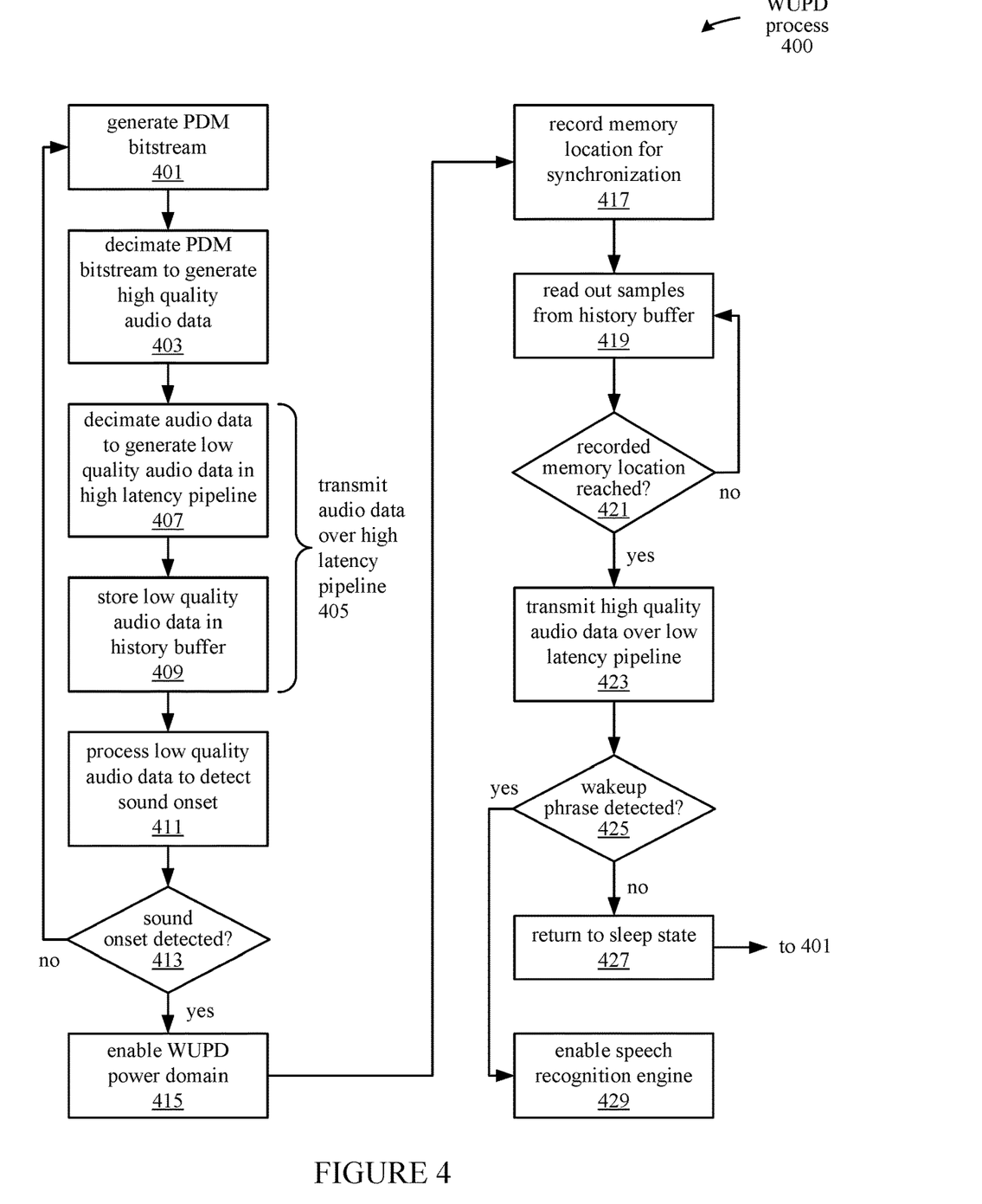
FIG. 4 illustrates a flow diagram of process for performing wakeup phrase detection in a computing system, according to an embodiment.

FIG. 4 is a flow diagram illustrating an embodiment of a WUPD process. The operations in the WUPD process 400 are performed by components in the computing system 100, such as the SOD and WUPD circuitry in the phrase detection circuit 110.

At block 401, the PDM front end 211 generates a PDM bitstream from a transducer signal, such as a transducer in microphone 111. The PDM circuit 221 in the PDM front end 211 generates the PDM bitstream and provides the PDM bitstream to the decimator 222. At block 403, the decimator 222 decimates the PDM bitstream to generate an audio data signal having a reduced sampling rate, relative to the initial sampling rate at the microphone 111. This audio data represents the high quality (i.e., higher sampling rate) audio data that is transmitted over the low latency pipeline and is used for performing WUPD and general speech recognition.

At blocks 405, the audio data is transmitted over the high latency pipeline. Blocks 405 include blocks 407 and 409. At block 407, the high quality audio data is received at a second decimator 212, which reduces the sample rate of the high quality audio data to generate the low quality (i.e., lower sampling rate) audio data at its output. At block 409, a portion of the audio data at the lower sampling rate is stored in the history buffer 216. A fixed number of the most recent data samples are stored in the history buffer 216 at the lower sampling rate.

The low quality audio data is also provided from the decimator 212 to the SOD 213. The SOD 213 processes the low quality audio data to determine whether any speech onset event (e.g., the beginning of a spoken wakeup phrase following a period of silence) has been captured in the audio data. In alternative embodiments, the SOD 213 monitors for the onset of sounds other than speech (e.g., tones, whistles, alarms, etc.). At block 413, if the SOD 213 does not detect a speech onset event, the process 400 returns to block 401. The process 400 thus repeats blocks 401-413 to generate the high and low quality audio data, update the history buffer 216 with the most recent samples of audio data, and continue monitoring for speech onset until speech onset is detected.

At block 413, if the SOD 213 detects a speech onset event, the SOD asserts the SOD flag 214 indicating to the power management unit 215 that the speech onset event has occurred. At block 415, the power management unit 215 enables the WUPD power domain 240, which supplies power to the WUPD circuitry. In one embodiment, this transitions the WUPD circuitry from a low power consumption state (e.g., sleep state) to a higher power consumption state (e.g., working state).

At block 417, when the WUPD processing unit 248 is active and begins receiving the second portion of the audio data via the DMA stream, the synchronization circuit 217 records a memory location in the history buffer 216 that corresponds to the time of an initial data sample of the DMA stream. At block 419, the processing unit 248 reads the first portion of the audio data from the history buffer 216. The history buffer 216 provides the requested samples asynchronously to the processing unit 248. At block 421, if the memory location recorded by the synchronization circuit 217 has not been reached in the history buffer 216, the process 400 returns to block 419. The process 400 thus repeats blocks 419 and 421 to read out the audio data from the history buffer 216 until the recorded memory location is reached.

At block 421, if the recorded memory location in the history buffer 216 is reached, then all of the data samples in the history buffer 216 for the period of time prior to the start of the DMA stream have been read out. The process 400 continues at block 423, where the processing unit 248 transitions from reading audio data from the history buffer 216 (i.e., via the high latency pipeline) to reading data from the DMA stream (i.e., the low latency pipeline). By the operation of blocks 417-423, the transmission of the first portion of audio data via the high latency pipeline is synchronized with the transmission of the second portion via the low latency pipeline so that any gap or overlap in the sampled time between the two portions is minimized. The latency of the samples being processed by the processing unit 248 decreases over time, as the buffered audio data is processed faster than new audio samples are generated.

As the first and second portions of the audio data are received (as provided at blocks 419-423), the WUPD processing unit 248 performs a wakeup phrase recognition process on the received audio data to determine whether the audio data has recorded a user speaking the wakeup phrase. At block 425, if the wakeup phrase is not detected in the audio data, the WUPD circuitry returns to the low power consumption sleep state as provided at block 427, the process 400 continues back to block 401. The process 400 thus repeats blocks 401-427, transmitting audio data via the high latency and low latency pipelines, activating the WUPD circuitry each time a speech onset event is detected, and determining whether the wakeup phrase has been recorded. The loop of blocks 401-427 is repeated until the wakeup phrase is detected at block 425.

At block 425, if the wakeup phrase is detected in the audio data, the process 400 continues at block 429. At block 429, the processing unit 248 enables the speech recognition engine. In one embodiment, the processing unit 248 enables another power domain that supplies power to components in the computing system 100 such as the processing unit 104, memory 105, etc., which are transitioned from a low power consumption state (e.g., a sleep state) to a higher power consumption state (e.g., a working state). The speech recognition engine, implemented by the processing unit 104 executing instructions 106, identifies voice commands or natural language spoken by the user by processing audio data transmitted over the high quality, low latency pipeline and received via the DMA stream, which continues after the WUPD is completed.

The computing device 100 thus utilizes the high latency and low audio quality pipeline for performing SOD (or NTLA), and the low latency and high audio quality pipeline for performing WUPD processing and subsequent speech recognition tasks. Power is conserved during the time spent waiting for a speech onset event since the SOD operates on lower quality audio data, allowing the SOD circuitry to operate at a lower clock rate. The WUPD and subsequent speech recognition tasks are performed using the high quality and low latency pipeline, resulting in increased recognition accuracy and responsiveness to user commands.

In one embodiment, the dual pipeline approach illustrated above in which a low power consumption event detection process responds to a detected event by enabling a higher power consumption pattern recognition process can be used in applications other than speech detection. For such applications, the low powered event detection can also be performed based on lower quality transducer or sensor data while the higher powered pattern recognition is performed using higher quality (e.g., higher sample rate and/or resolution) data. For example, a motion onset detector can detect motion following a period of little or no motion using a low quality video stream, then respond to the detected motion by enabling a higher power consumption pattern recognition process (e.g., facial recognition) that uses a higher quality video stream. Further actions can be performed based on the result of the pattern recognition, such as recording audio, video, or still images, sending a notification, etc. In alternative embodiments, the higher powered pattern recognition process is enabled by an onset event detector in response to detecting events such as changes in temperature, ambient light, environmental conditions, or any of a number of conditions or events that can be sensed.

In the foregoing embodiments, various modifications can be made; for example, signals described as being asserted with a high voltage may instead be asserted with a low voltage, or specified components can be replaced with other components having similar functionality. As described herein, conductive electrodes that are "electrically connected" or "electrically coupled" may be coupled such that a relatively low resistance conductive path exists between the conductive electrodes. Quantities, dimensions, or other values described as "substantially" equal may be nominally equal but need not be exactly equal (with variations due to manufacturing tolerances, environmental conditions, quantization or rounding error, and/or other factors), or may be sufficiently close to equal for achieving an intended effect or benefit.

Embodiments described herein include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the claimed subject matter has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A device, comprising:
an audio data source;
a high latency pipeline configured to transmit a first portion of audio data from an audio data source to a processing unit, wherein the high latency pipeline comprises:
a first decimator coupled with the audio data source and configured to reduce a sample rate of the first portion of the audio data, and
a history buffer configured to store the first portion of the audio data at the reduced sample rate from an output of the first decimator;
a low latency pipeline configured to transmit a second portion of the audio data from the audio data source to the processing unit with a lower latency than the high latency pipeline, wherein the audio data source comprises a second decimator having an output coupled with the high latency pipeline and the low latency pipeline;
a sound onset detector coupled with the audio data source and configured to detect a sound onset event based on the first portion of the audio data at the reduced sample rate;
a synchronization circuit coupled with the high latency pipeline and the low latency pipeline, and configured to, in response to the sound onset event, synchronize output to the processing unit of the first portion of the audio data from the history buffer and the second portion of the audio data via the low latency pipeline; and a power management unit coupled with the sound onset detector and configured to wake the processing unit from a sleep state to an operating state in response to the sound onset detector detecting the sound onset event.

2. The device of claim 1, wherein the first portion of the audio data has a lower sample rate than the second portion of the audio data.

3. The device of claim 1, wherein:
the history buffer comprises a circular buffer configured to store the first portion of the audio data; and
the first portion of the audio data comprises a fixed number of most recent data samples from the audio data source.

4. The device of claim 1, wherein:
the history buffer is further configured to provide samples of the first portion of the audio data asynchronously to the processing unit; and
the low latency pipeline is further configured to transmit the second portion of the audio data as a data stream.

5. The device of claim 1, wherein the synchronization circuit is coupled with the processing unit, and is further configured to synchronize the output by recording a memory location in the history buffer corresponding to a time of an initial data sample of the second portion of the audio data transmitted to the processing unit.

6. The device of claim 1, wherein:
the sound onset detector and the history buffer are supplied power in a first power domain; and
the processing unit is supplied power in a second power domain isolated from the first power domain,
wherein the power management unit is configured to wake the processing unit from the sleep state by enabling the second power domain in response to the sound onset detector detecting the sound onset event.

7. The device of claim 1, wherein the audio data source comprises:
a pulse density modulator configured to generate a pulse density modulated bitstream based on a transducer signal,
wherein the second decimator is coupled with the pulse density modulator and is configured to generate the audio data by reducing a sample rate of the pulse density modulated bitstream.

8. The device of claim 1, wherein:
the sound onset detector comprises a speech onset detector; and
the sound onset event comprises a speech onset event.

9. A method, comprising:
generating audio data by, in a first decimator in an audio data source, reducing a sample rate of an input bitstream;
transmitting over a high latency pipeline a first portion of audio data from the audio data source to a processing unit;
reducing a sample rate of the first portion of the audio data in a second decimator;
storing the first portion of the audio data at the reduced sample rate in a history buffer in the high latency pipeline;
transmitting over a low latency pipeline a second portion of the audio data from the audio data source to the processing unit with a lower latency than the high latency pipeline;
detecting a speech onset event based on the first portion of the audio data at the reduced sample rate, wherein the first portion of the audio data has a lower sample rate than the second portion of the audio data; and
in response to the speech onset event,
synchronizing output to the processing unit of the first portion of the audio data from the history buffer and of the second portion of the audio data via the low latency pipeline, and
waking the processing unit from a sleep state to an operating state.

10. The method of claim 9, wherein storing the first portion of the audio data in the history buffer comprises storing a fixed number of the most recent data samples from the audio data source in the history buffer, wherein the history buffer is a circular buffer.

11. The method of claim 9, further comprising:
providing samples of the first portion of the audio data asynchronously from the history buffer to the processing unit; and
transmitting the second portion of the audio data as a data stream via the low latency pipeline.

12. The method of claim 9, further comprising:
synchronizing the output by recording a memory location in the history buffer corresponding to a time of an initial data sample of the second portion of the audio data transmitted to the processing unit.

13. The method of claim 9, wherein:
detecting the speech onset event is performed by a speech onset detector; and
the method further comprises:
supplying power to the speech onset detector and the history buffer in a first power domain,
supplying power to the processing unit in a second power domain isolated from the first power domain, and
waking the processing unit from the sleep state by enabling the second power domain in response to the detecting of the speech onset event.

14. The method of claim 9, further comprising generating the audio data by:
generating a pulse density modulated bitstream based on a transducer signal; and
reducing a sample rate of the pulse density modulated bitstream.

15. A system, comprising:
an audio data source comprising:
an audio transducer for capturing audio data, and
a first decimator coupled with the audio transducer;
a processing unit configured to recognize a sound pattern in the audio data;
a low sampling rate pipeline coupled with an output of the first decimator and configured to transmit a first portion of the audio data to the processing unit, wherein the low sampling rate pipeline comprises:
a second decimator coupled with the audio transducer and configured to reduce a sample rate of the first portion of the audio data, and
a history buffer configured to store the first portion of the audio data at the reduced sample rate from an output of the second decimator;
a high sampling rate pipeline coupled with the output of the first decimator and configured to transmit a second portion of the audio data to the processing unit with a higher sampling rate than the low sampling rate pipeline;

a sound onset detector coupled with the audio transducer and configured to detect a sound onset event based on the first portion of the audio data at the reduced sample rate;

a synchronization circuit coupled with the low sampling rate pipeline and the high sampling rate pipeline, and configured to, in response to the sound onset event, synchronize output to the processing unit of the first portion of the audio data from the history buffer and the second portion of the audio data via the high sampling rate pipeline; and a power management unit coupled with the sound onset detector and configured to wake the processing unit from a sleep state to an operating state in response to the sound onset detector detecting the sound onset event.

16. The system of claim 15, wherein:

the sound onset detector and the history buffer are supplied power in a first power domain; and the processing unit is supplied power in a second power domain isolated from the first power domain, wherein the power management unit is configured to wake the processing unit from the sleep state by enabling the second power domain in response to the sound onset detector detecting the sound onset event.

17. The system of claim 15, wherein:

the synchronization circuit is further configured to synchronize the output by recording a memory location in the history buffer corresponding to a time of an initial data sample of the second portion of the audio data transmitted to the processing unit; and the processing unit is further configured to:

retrieve samples of the first portion of the audio data from a sequence of memory locations in the history buffer until reaching the recorded memory location, and in response to reaching the recorded memory location, retrieve the initial data sample of the second portion of the audio data.

18. The system of claim 15, wherein:

the sound pattern comprises a wake-up phrase;

the processing unit is further configured to initiate a speech recognition engine in response to recognizing the wake-up phrase; and the speech recognition engine is configured to recognize one or more voice commands from the second portion of the audio data transmitted via the high sampling rate pipeline.

19. The system of claim 15, further comprising:

a network adapter configured to transmit one or more network messages in response to the recognized one or more voice commands; and a speaker device configured to generate a sound output in response to the recognized one or more voice commands.

* * * * *